United States Patent [19]
Meis et al.

[11] Patent Number: 5,902,435
[45] Date of Patent: May 11, 1999

[54] FLEXIBLE OPTICAL CIRCUIT APPLIQUES

[75] Inventors: Michael Alan Meis, Stillwater; Gordon Dwight Henson, Lake Elmo; Terry Lee Smith, Roseville, all of Minn.; Robert Travis Smith, Round Rock, Tex.; Dewain Robert Goff, Newport, Minn.

[73] Assignee: Minnesota Mining and Manufacturing Company, St. Paul, Minn.

[21] Appl. No.: 08/775,849

[22] Filed: Dec. 31, 1996

[51] Int. Cl.[6] ............................ B32B 31/00; B32B 5/02
[52] U.S. Cl. .................... 156/230; 156/293; 428/343; 428/347; 428/364; 428/369; 428/914
[58] Field of Search ....................... 156/166, 176, 156/178, 179, 276, 293, 230; 428/40.4, 41.8, 364, 369, 343, 347, 914, 915; 65/385; 385/114

[56] References Cited

U.S. PATENT DOCUMENTS

| | | | |
|---|---|---|---|
| 4,138,193 | 2/1979 | Olszewski et al. | 385/114 |
| 4,307,386 | 12/1981 | Bridge | 156/176 X |
| 4,529,645 | 7/1985 | Berg et al. | |
| 4,597,030 | 6/1986 | Brody et al. | |
| 4,650,704 | 3/1987 | Rothenberg | |
| 4,783,354 | 11/1988 | Fagan | |
| 4,847,596 | 7/1989 | Jacobson et al. | |
| 5,076,881 | 12/1991 | Ferguson | 156/179 X |
| 5,160,569 | 11/1992 | Ott et al. | 156/179 X |
| 5,204,925 | 4/1993 | Bonanni et al. | 385/89 |
| 5,292,390 | 3/1994 | Burak et al. | 156/176 |
| 5,296,277 | 3/1994 | Wilson et al. | 428/40 |
| 5,327,513 | 7/1994 | Nguyen et al. | 385/114 |
| 5,362,516 | 11/1994 | Wilson et al. | 427/207.1 |
| 5,381,504 | 1/1995 | Novack et al. | 385/128 |
| 5,394,504 | 2/1995 | Burack et al. | 156/176 X |
| 5,449,540 | 9/1995 | Calhoun et al. | 428/42 |
| 5,521,992 | 5/1996 | Chun et al. | 385/14 |
| 5,611,017 | 3/1997 | Lee et al. | |
| 5,676,787 | 10/1997 | Rusincovitch et al. | |

FOREIGN PATENT DOCUMENTS

| | | |
|---|---|---|
| 0 587 336 A2 | 8/1993 | European Pat. Off. |
| 2 574 562 | 6/1986 | France |
| 8-151755 | 6/1996 | Japan ............ E04F 13/00 |

OTHER PUBLICATIONS

Flexible Optical Backplane Interconnections, M. A. Shahid et al., 1996 IEEE *Proceedings of MPPOI '96*, pp. 178–185.

*Primary Examiner*—Curtis Mayes
*Attorney, Agent, or Firm*—Néstor F. Ho; H. Sanders Gwin, Jr.

[57] ABSTRACT

A preformed fiber optic applique having a backing layer is provided. The backing layer or film, has an adhesive coating applied thereon. At least one optical fiber is routed and bonded to the adhesive layer providing a continuous optical signal path from one end to another. A releasable liner is releasably attached to the adhesive layer and positioned to cover the backing layer including the at least one optical fiber. Microstructures are provided on the backing layer in one embodiment. The microstructures are crushable structures that prevent the adhesive from immediately adhering to a substrate.

23 Claims, 7 Drawing Sheets

FLEXIBLE OPTICAL CIRCUIT APPLIQUES

BACKGROUND OF THE INVENTION

The present invention relates to flexible optical circuits. In particular, the present invention relates to flexible optical circuits having a backing layer, an adhesive coating and a release liner for attachment to a substrate such as an electronic printed circuit board.

The design of electronic circuits requires interconnections between devices for proper operation. With increased sophistication and operation speeds, design of functional interconnections requires careful engineering. The fastest data processing circuits and emerging technologies require large numbers of interconnects capable of carrying extremely high speed digital signals. Due to the increasing push for higher and higher speeds, engineers are facing fundamental limits in designing electronic interconnects.

In an attempt to handle higher speeds, interconnection technology has turned to optical interconnects for next generation circuits. Optical circuits have bandwidth capabilities orders of magnitude beyond electrical circuits, and are inherently immune to electrical interference. In some known designs, discrete fiber optic cables and fiber bundles are used to interconnect devices. Known standard fiber optic connection technology employed to connect optical fibers to devices are adequate for small numbers of interconnections. However, as optical circuit density grows, the physical bulk of cables and connectors make this approach unwieldy, especially for compact designs.

Attempts have been made to incorporate optical interconnects onto the surface of electronic circuit boards and substrates by constructing wave guides using optical polymers coated to the surface. An example of this is found in U.S. Pat. No. 5,521,992 to Chun, et al. The technology of the '992 patent requires highly specialized tooling to generate each custom optical circuit thus standard circuit boards cannot be used. For simple circuits, tooling costs may be prohibitive. Waveguide fabrication is also difficult due to the small geometry of the guide regions, and optical quality of finished wave guides is poor due to limitations in optical polymer chemistry.

Flexible optical interconnect circuit packs are also known in the art. An example of this is found in U.S. Pat. No. 5,204,925 to Bonanni, et al. The known optical interconnect circuits have optical fibers bonded between two flexible substrates and have one or more optical connectors connected along the edges of the circuit pack. The connectors are then connected to one or more optical devices. These known devices are not adapted to bond to a substrate or circuit board.

The concept of using high bond strength pressure sensitive adhesive coated laminating films is not new. However, there are certain problems associated with the known adhesive coated films. For instance, it is often difficult to obtain accurate positioning during film use. Improper placement, static charge, and accidental contact can all contribute to misalignment and immediate bonding to the surface in undesired positions. Because of the immediate aggressive bonding, if alignment is off, the film is often destroyed or seriously damaged attempting to remove the film for repositioning.

One known solution to the above problem is to use a less aggressive adhesive so the user may remove or reposition the film in case of misalignment. This can result in poor long term adhesion. Another known solution is to use a partially cured adhesive material followed by a final curing process. This not only results in additional process step, but may be impractical for many applications. Yet another known solution is to prepare a surface wetted with a material that interferes with adhesion and then removing the wetting agent after final alignment is achieved. This approach can be messy and adds process steps.

There is a continuing need for flexible optical circuits capable of being applied to new circuit board designs without changing board design and fabrication techniques. There is also a continued need for a laminating film that allows for repositioning of the optical circuits to achieve proper alignment.

SUMMARY OF THE INVENTION

The present invention provides a flexible optical circuit applique that can be mounted on a circuit board without modifying the circuit board substrate or the electronic circuits. The optical circuit applique of the present invention is also repositionable. A method of manufacturing flexible optical circuit appliques is also provided.

A preformed fiber optic applique is provided having a backing layer. The backing layer or film, has an adhesive coating applied thereon. At least one optical fiber is routed and bonded to the adhesive layer providing a continuous optical signal path from one end to another. A releasable liner is releasably attached to the adhesive layer and positioned to cover the backing layer including the at least one optical fiber.

In one embodiment of the present invention, microstructures are provided on the backing layer. The microstructures are crushable structures that prevent the adhesive coating from immediately adhering to a substrate. This allows the film to be repositioned until proper alignment has been achieved. Upon the application of appropriate force, the microstructures will crush allowing the adhesive coating to bond the film to the substrate.

A method of fabricating the fiber optic appliques of the present invention is also disclosed. The method includes the steps of providing a supply of backing layer and applying an adhesive coating to the backing layer. At least one fiber is then provided and placed on the adhesive coating. Pressure is then applied to the at least one fiber to secure it to the backing layer.

DETAILED DESCRIPTION OF THE INVENTION

The present invention provides a flexible optical circuit applique having a flexible backing with fibers bonded thereto covered by a releasable liner. The optical appliques are intended to provide an easy means for adding optical circuits to electronic circuit boards or other substrates by laminating. The flexible optical circuits of the present invention can also be incorporated into new board designs without changing standard board design and fabrication techniques. The optical appliques of the present invention are also repositionable on a substrate prior to bonding.

Figure 1:
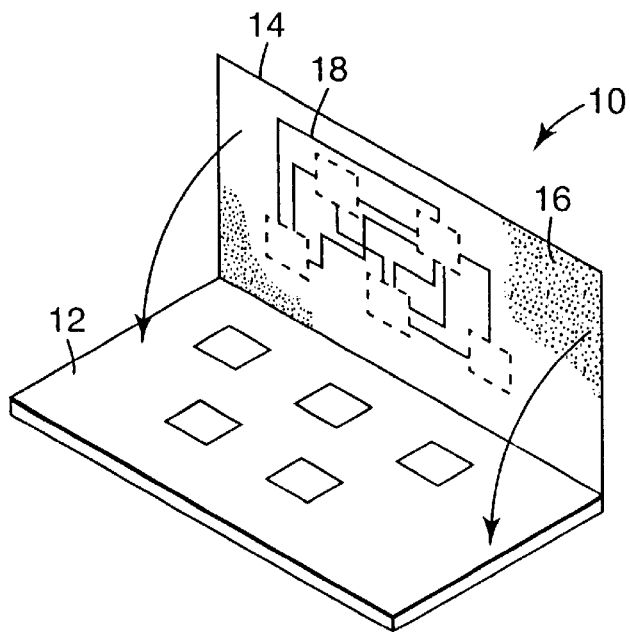
FIG. 1 is an exploded perspective view of an electrical circuit board and a flexible optical circuit applique according to the present invention.

FIG. 1 is a perspective view of a preferred embodiment of a flexible optical circuit applique 10 according to the present invention. Also illustrated is a printed circuit board 12 to which applique 10 is to be mounted. Applique 10 comprises a durable backing material 14 that is coated with a temporarily repositionable adhesive 16. Applique 10 also includes optical fibers 18 bonded to backing 14 via adhesive 16. The particular backing material used depends upon the particular application. For instance, if high durability is desired, a polyester-type backing would be used. If the applique is to be mounted on a curved substrate, a flexible backing material would be chosen. Examples of backing materials include vinyl, polyurethane, polyamide, and polyester.

Adhesive 16 of the present invention is any temporarily repositionable adhesive. By temporarily repositionable, it is meant that the bond between the adhesive and the substrate is such that the material having the adhesive may be removed from the substrate without damaging either for a period of time or until the occurrence of a specified event which then permanently adheres the backing to the substrate. In the preferred embodiment, adhesive 16 is preferably a pressure sensitive adhesive. Pressure sensitive adhesives are known in the industry as a standard class of materials. They are adhesives, which in dry form (substantially solvent free except for residual solvent) are aggressively and permanently tacky at room temperature (approximately 15° to 25° C.) and firmly adhere to a variety of similar surfaces upon mere contact without the need for more than manual pressure. The adhesives require no activation by water, solvent, or heat in order to exert a strong adhesive holding force towards such materials as paper, cellophane, glass, plastic, wood, and metals. The adhesives have a sufficiently cohesive holding and elastic nature such that, despite their aggressive tackiness, it can be handled with fingers and removed from smooth surfaces without leaving a substantial residue. For a more detailed discussion of pressure sensitive adhesives, reference should be made to U.S. Pat. Nos. 5,296,277, 5,362,516 and 5,449,540, which are assigned to the Assignee of the present invention and the disclosures of which are herein incorporated by reference.

If adhesive 16 has low tack, e.g. is only slightly sticky to the touch and has low adhesion to certain types of surfaces, a release liner may not be required to cover the adhesive layer, and the backing material 14 may act as a release liner when the film is rolled.

A light cured adhesive could be used with a transparent backing layer without departing from the spirit or scope of the invention. Such an adhesive would allow the film to be repositioned on a substrate until a light source, typically an ultra violet light, is applied through the transparent film which would then activate the adhesive to secure the film to the substrate. Nonpressure sensitive adhesives, heat curable adhesives thermally activated adhesives such as hot melt glue or solvent activated adhesives could also be used if desired, without departing from the spirit or scope of the invention. They are, however, less preferred embodiments because of the additional application steps and greater tendency to entrap air during application.

Optical fibers 18 of the present invention are preferably 80 to 100 micron glass (silica) diameter fibers with a special fiber coating described in U.S. Pat. No. 5,381,504. Standard glass optical fibers have 125 micron outside diameters. By using glass fibers with diameters of 80 to 100 microns, the present invention can obtain bend radiuses as small as 0.25 inches (0.64 cm) while staying below a bending stress of 100 K psi. At a bend radius of 0.25 inches (0.64 cm), a fiber having a diameter of 125 microns has a bending stress of approximately 110 K psi and a fiber having a diameter of 200 microns has a bending stress of approximately 175 K psi. In the preferred embodiment of the present invention, bend radii of less than 0.3 inches (0.76 cm) are achieved at bend stresses of less than 100 K psi.

Figure 2A:
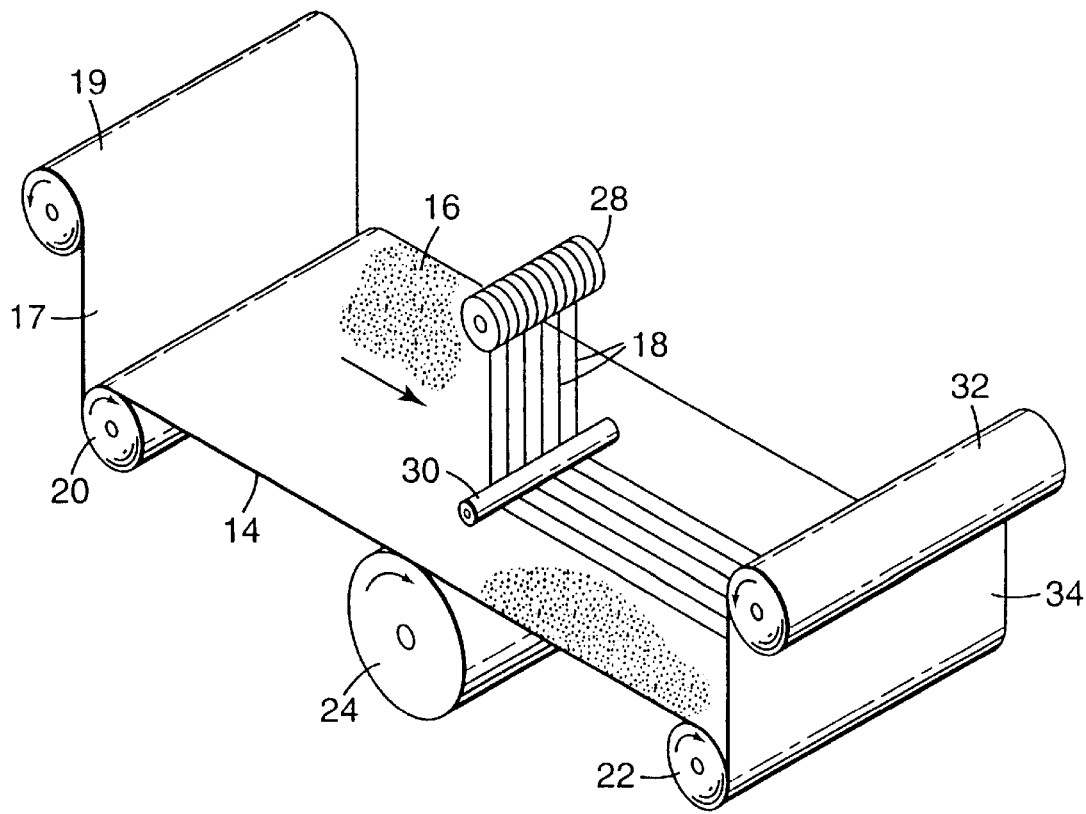
FIG. 2a illustrates a preferred method of fabricating an optical circuit applique according to the present invention.

FIG. 2a illustrates a preferred method of fabricating an applique according to the present invention. A supply roll 20 of applique backing layer or film, 14 is provided, as is a takeup roll 22. Film 14 is precoated with an adhesive layer 16 and covered with a releasable liner 17. A second takeup roller 19 is provided to take away releasable liner 17 as illustrated. A rotating drum 24 is provided to move backing film 14 from supply roll 20 to takeup roll 22. Multiple spools 28 of fibers 18 are provided and are suspended above backing film 14. A laminating roll spacing guide 30 is provided to space fibers 18 as desired and to press the fibers onto backing film 14 with sufficient force to activate pressure sensitive adhesive 16 to bond fibers 18 in place. A second supply roller 32 is provided carrying a second releasable liner 34 which releasably adheres to pressure sensitive adhesive 16. It should be noted that film 14 may be a continuous and solid film or it may have holes formed therethrough for connectorization with optical circuit components, as will be described in greater detail below.

Figure 2B:
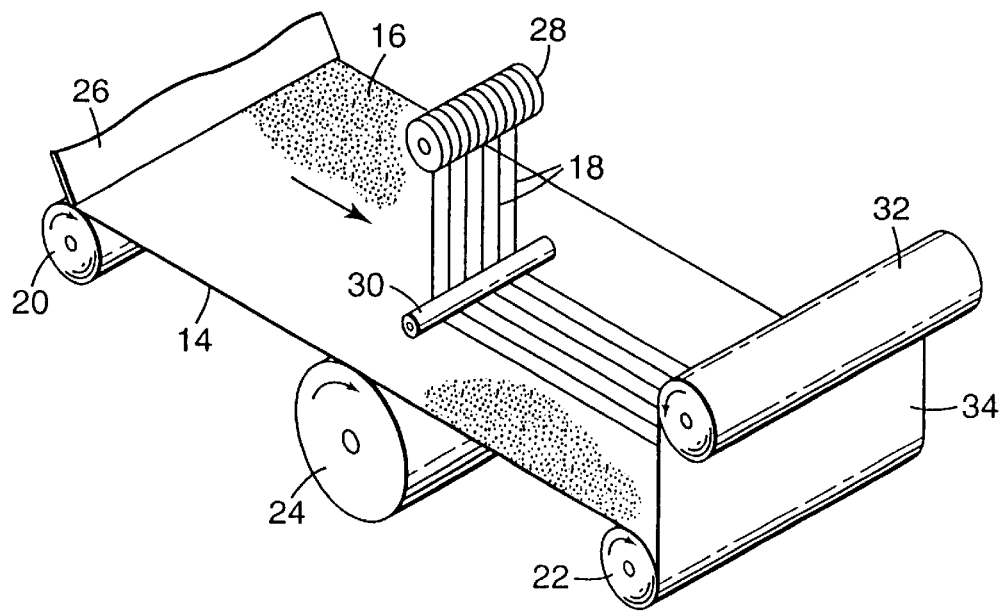
FIG. 2b illustrates an alternative method of fabricating an optical circuit applique according to the present invention.

FIG. 2b illustrates an alternative method of fabricating an applique according to the present invention. FIG. 2b is similar to FIG. 2a and thus like elements are correspondingly identified. Supply roll 20 of applique backing film 14 is provided as is takeup roll 22. Rotating drum 24 is provided to move backing film 14 from supply roll 20 to takeup roll 22. A pressure sensitive adhesive coating device 26 is provided to apply a coating of pressure sensitive adhesive 16 to backing film 14 as the backing film comes off of supply roll 20. Multiple spools 28 of fibers 18 are provided and are suspended above backing film 14. Laminating roll spacing guide 30 is provided to space fibers 18 as desired and to press the fibers onto backing film 14 with sufficient force to activate pressure sensitive adhesive 16 to bond fibers 18 in place. Second supply roller 32 is provided carrying release liner 34 which releasably adheres to pressure sensitive adhesive 16.

One alternative method of optically connecting a plurality of optical components on a substrate includes the steps of providing a backing layer, providing at least one optical fiber coated with an adhesive, placing the optical fiber on the backing layer in a desired pattern and releasably securing the fiber to the backing layer. The fiber and the backing layer are placed on a substrate in a desired position and the fiber is fixedly adhered to the substrate. The backing layer may be removed while leaving the fiber adhered to the substrate.

Fabricating appliques in a continuous web process, as illustrated in FIGS. 2a and 2b is a very cost effective way to fabricate the appliques. Depending upon the length of appliques desired, large numbers of standard appliques can easily be made from a single roll of backing film 14.

Figure 3A:
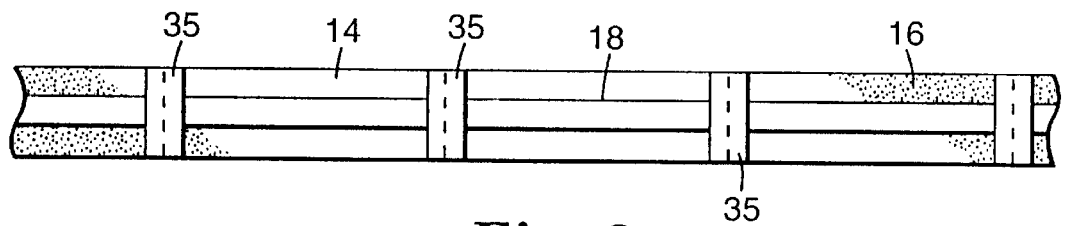
FIGS. 3a, b, c, and d illustrate alternative embodiments of a continuous web with fibers available for connectorization.
Figure 3B:
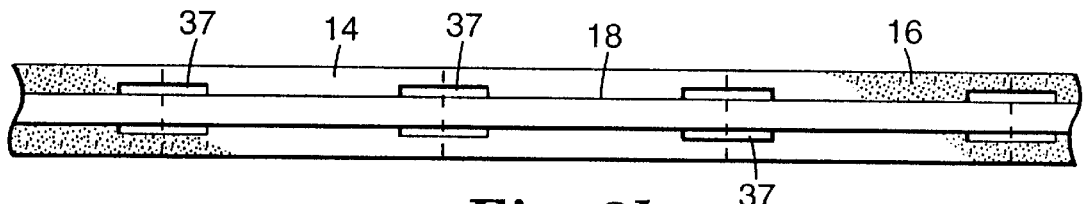

FIGS. 3a–3d illustrate alternative ways to make fibers 18 available for connectorization in a continuous web process similar to those described in FIGS. 2a and 2b above. It should be noted that the examples given below are given only as exemplary ways to avail the fibers for connectorization, and the examples given are not meant to be an exhaustive list. The illustrations in FIGS. 3a–3d use some of the same components as used in FIGS. 1 and 2, therefore, like elements will be correspondingly identified. In FIG. 3a, film 14 is coated with adhesive layer 16. Fibers 18 are bonded to adhesive layer 16 as previously described. A release strip 35 is provided across the width of film 14 at predetermined intervals. The web is then cut at release strips 35. When applied to a substrate, release strips 35 prevent the ends of the individual applique section from adhering to the substrate thus allowing the ends of the fibers to be prepared for connectorization. It should be noted that release strip 35 not need to extend across the entire width of film 14. In FIG. 3b, a series of receiving cavities 37 are formed through film 14. The receiving cavities allow access to fibers 18 when the applique is adhered to a substrate.

Figure 3C:
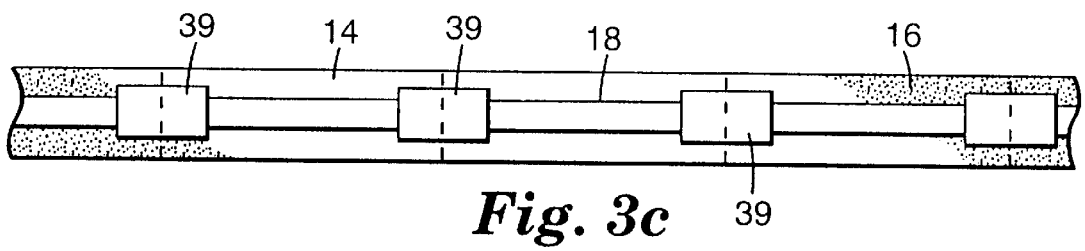
Figure 3D:
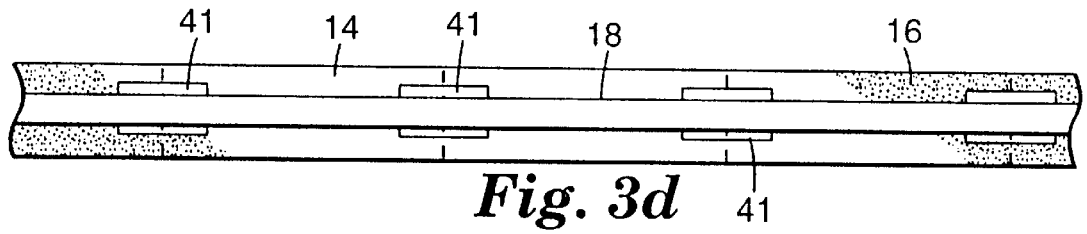

FIG. 3c illustrates a series of mechanical alignment devices 39 spaced at desired locations along the continuous web. Alignment devices 39 provide mechanical alignment for fibers 18 and also function as release liners. Mechanical alignment devices 39 are preferably V grooved structures, but may also be U shaped or other shapes that provide adequate alignment for fibers 18. After fibers 18 have been adhered to adhesive surface 16 of film 14, alignment device 39 may be removed prior to adhering to a substrate. Alignment device 39 could also be left in place with the applique adhered to a substrate. A connector assembly is then mounted around the fibers. In FIG. 3d, an adhesiveless area 41 is provided on film 14. Thus, when film 14 is adhered to substrate, fibers 18 are not adhered to the substrate in adhesiveless area 41.

The design of the applique according to the present invention including the number of fibers, the spacing of the fibers as well as the routing patterns can be done during the manufacturing process using a simple process control computer software program. Therefore, a board designer may layout a board and provide the manufacturer of the appliques of the present invention a layout of the board and an applique may be quickly and easily laid out by the process control program. Design and manufacture of appliques of the present invention may be conducted by, for example, Icon Industries, Euless, Tex.

Figure 4A:
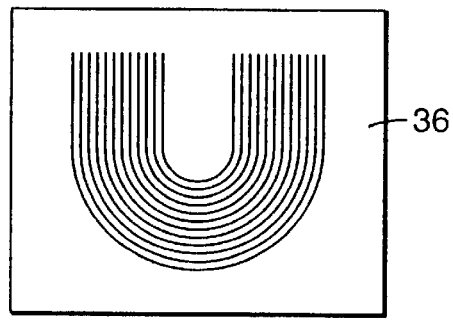
FIGS. 4a, b, and c illustrate standard sections of optical circuit appliques according to the present invention.
Figure 4B:
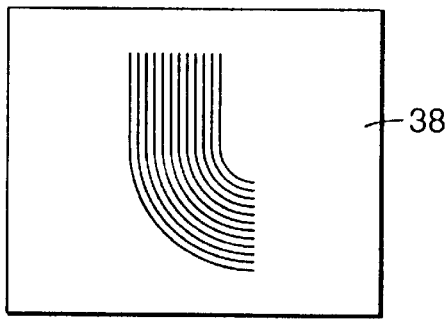
Figure 4C:
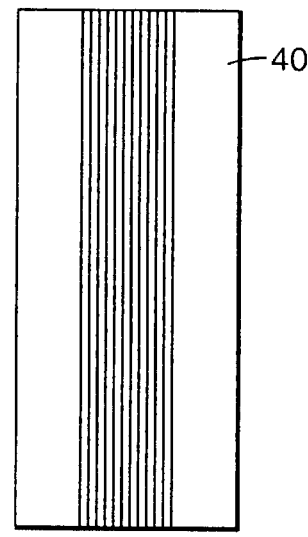

FIGS. 4a, b and c illustrate some standard applique constructions. FIG. 4a illustrates a 180° bend applique 36. FIG. 4b illustrates a 90° bend applique 38 and FIG. 4c illustrates a straight applique 40. Additional standard applique constructions besides the ones illustrated in FIGS. 4a–c, such as 30° bends, 60° bends, 45° bends etc., are also considered within the spirit and scope of the present invention. Additionally a continuous web construction having alternating patterns may be formed. Standard appliques such as those discussed above can be premade and purchased ready to use. Because the appliques of FIGS. 4a–c may be purchased as ready to use appliques, the ends of fibers 18 are also prepared for connectorization.

It should be noted that the fibers illustrated in FIGS. 4a–4c are shown stopping at the edge of the backing material. However, the fibers must be available for connectorization. Thus, any of the methods for making fibers available for connectorization, such as those described with respect to FIGS. 3a–3d, may be utilized.

Appliques 10 can be applied to circuit boards 12 or other substrates by users during the manufacturing process, by removing release liners 34 (not shown in FIGS. 4a, 4b or 4c) from the adhesive surface and laminating the applique to the circuit board surface. It should be noted that multiple appliques can be placed over one another without degrading performance.

Figure 5A:
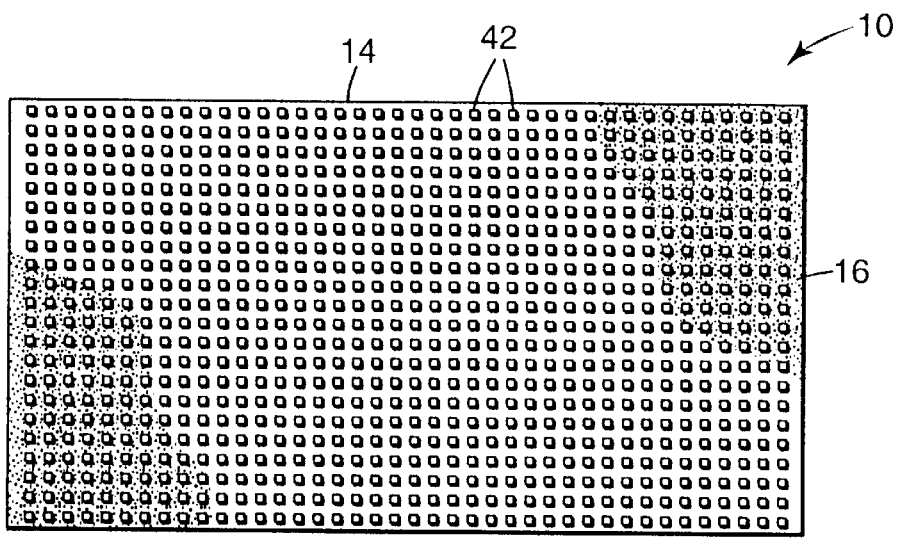
FIGS. 5a and b are top and side perspective views of the flexible optical circuit having microreplicated structures according to the present invention.
Figure 5B:
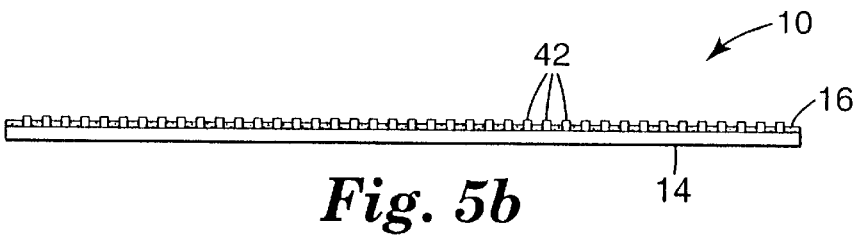

FIGS. 5a and b illustrate top and side perspective views of flexible optical circuit applique 10 incorporating microreplicated structures 42 formed on backing film 14 and/or in adhesive surface 16. Microreplicated structures 42 are provided to allow accurate positioning of applique 10. Improper placement or accidental contact of an active adhesive surface can contribute to misalignment and immediate bonding to the desired surface. Because the microstructures protrude up from backing film 14 and are taller than the depth of adhesive coating 16, microstructures 42 prevent intimate contact between adhesive surface 16 and circuit board 12 or other mounting surface. Structures 42 are crushable such that intimate contact between adhesive surface 16 and circuit board 12 is obtained when suitable pressure is applied. Thus, the present invention may be repositioned until accurate alignment is achieved and further provides a high final bond strength after lamination. The microreplicated structures of the present invention are preferably approximately 15 micrometers high. Additionally, the density or durometer of structures 42 can be varied to provide lesser or greater resistance to crushing or forming. For a more detailed description of microstructures 42, reference should be made to the above mentioned U.S. Pat. Nos. 5,296,277, 5,362,516 and 5,449,540 the disclosures of which were incorporated by reference. It should be noted that alternative embodiments of microstructures 42 or other repositionable adhesive constructions are also considered within the spirit and scope of the present invention. For instance, the adhesive, which maybe partially cured, may contain microspheres which may house a catalyst, either with or without the presence of microstructures 42, such that when sufficient force is applied, the microspheres, and microstructures if present, are crushed and the catalyst is released, reacting with adhesive 16 to form an aggressive adhesive.

Figure 6A:
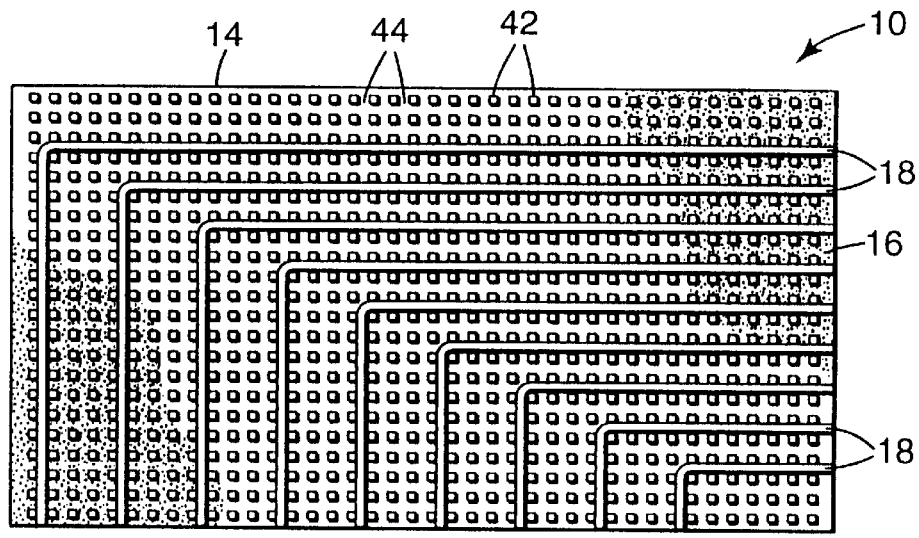
FIGS. 6a and b are top and side perspective views of the flexible optical circuits of FIGS. 5a and b having optical fibers placed thereon.
Figure 6B:
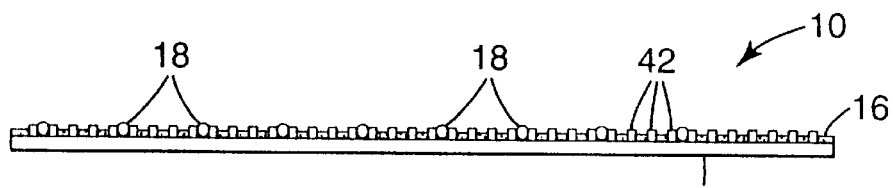

FIGS. 6a and b illustrate an applique having microstructures 42 arranged in desired patterns such that microreplicated structures 42 provide a guide for routing fibers 18 in precise locations when bonded to adhesive surface 16. As illustrated in FIGS. 6a and 6b, fibers 18 fit into channels 44 between structures 42 and may thus be bonded to adhesive surface 16 without crushing structures 42. As previously stated, the microstructures may be positioned as described to form any such pattern.

Microstructures 42 may be formed on backing film 14 before applying adhesive coating 16. Or, they may be added to adhesive surface 16 after applique 10 is constructed and fibers 18 are bonded to film 14 by having microstructures 42 picked up from an embossed release liner 34 which is attached immediately after fabrication.

FIGS. 7a–d illustrate steps for fabricating an applique according to the present invention that terminates fibers 18 in sockets or connectors. To facilitate the fabrication process, a multichip module positioning fixture 52 is provided to give support to backing film 14 and to provide a pattern for cutting out receiving cavities where sockets are inserted.

Figure 7A:
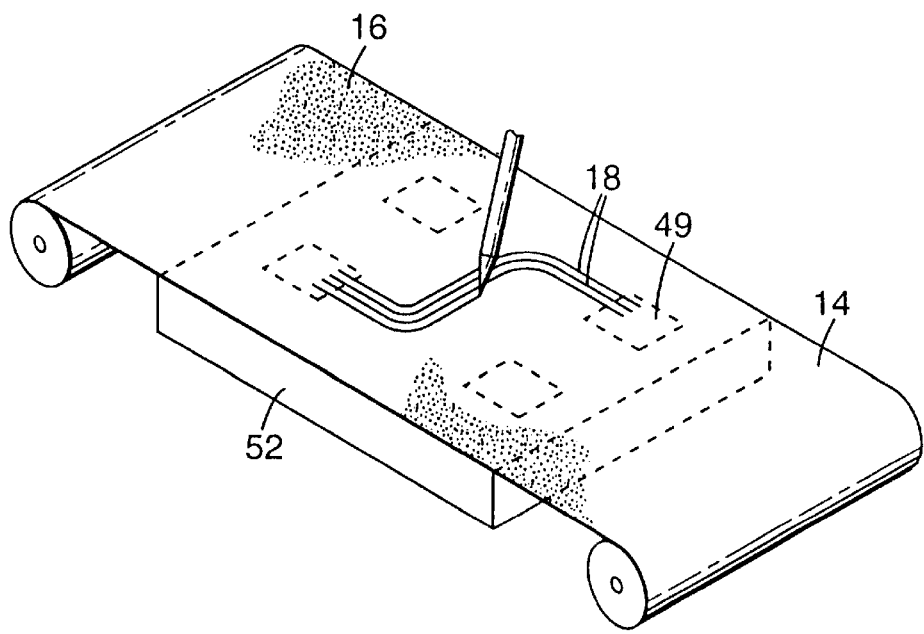
FIGS. 7a, b, c and d illustrate steps in a method for fabricating a flexible optical circuit and terminating the optical connectors at sockets according to the present invention.
Figure 7B:
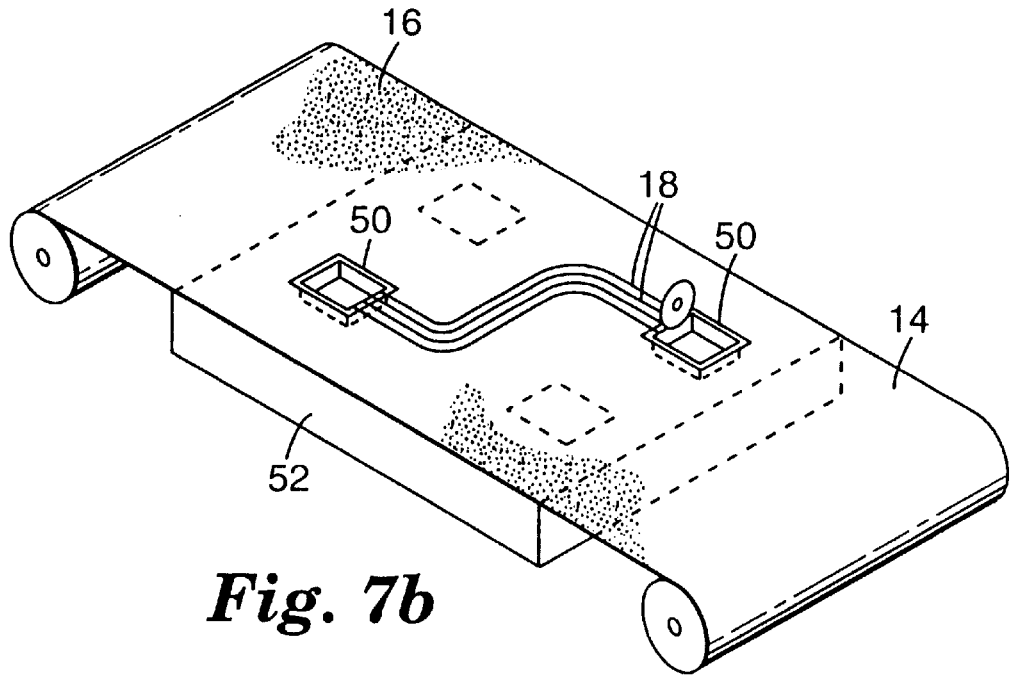
Figure 7C:
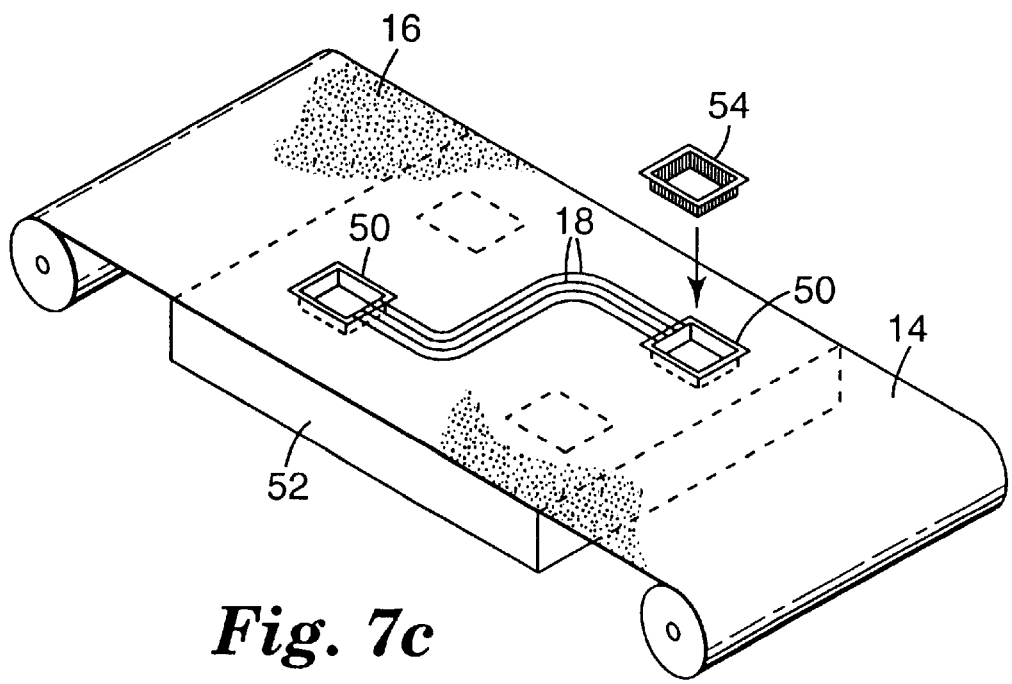
Figure 7D:
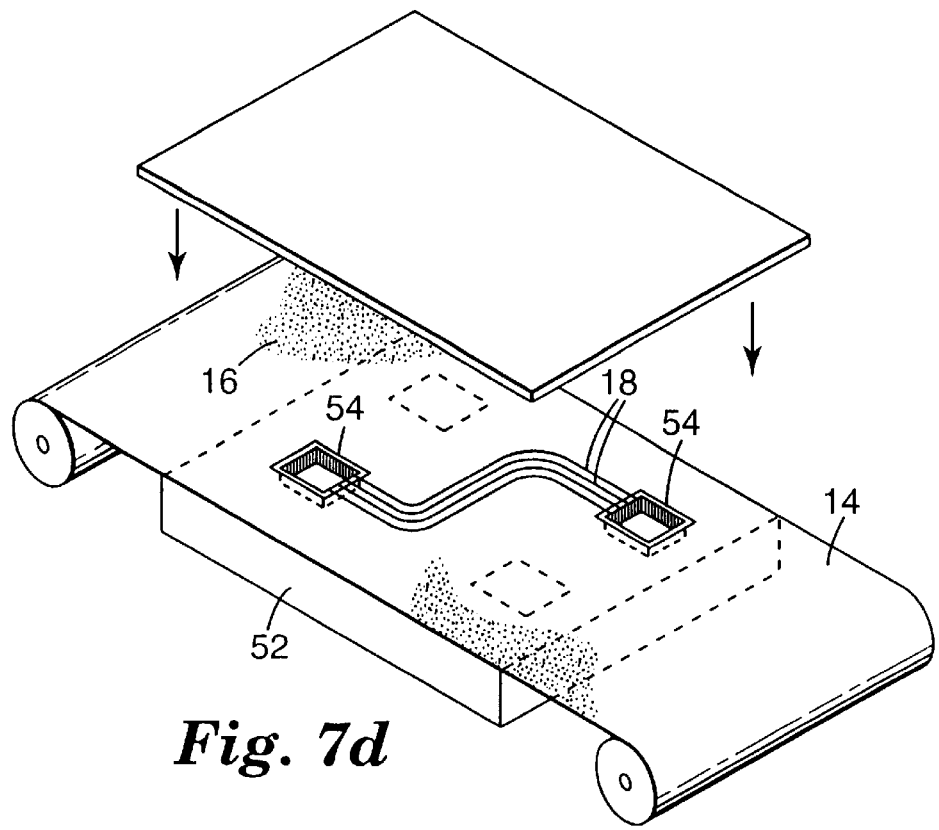

One preferred method of fabricating an applique according to the present invention having sockets inserted therein is described below. It should be noted that the below described method is given as one example and should not be considered the only way to fabricate an applique according to the present invention. Backing film 14 is unspooled and placed over positioning fixture 52 as illustrated in FIG. 7*a*. Pressure sensitive adhesive 16 is either applied to backing film 14 or backing film 14 already has an adhesive layer coating thereon. Optical fibers 18 are then routed to desired positions on backing film 14. The paths taken by fibers 18 may follow parallel or individual routes, and provide a continuous signal path from one end to another. The optical circuit paths may also cross previously installed fibers producing multiple layers to optimize path geometry. Once fibers 18 are routed appropriately, they are bonded to backing film 14 by applying sufficient force to activate pressure sensitive adhesive 16. At this point, backing film 14 is cut at positions 49 where sockets are to be installed. As shown in FIG. 7*b*, the ends of fibers 18 are then cut, cleaved, sawed, polished or otherwise prepared for termination depending on user requirements. For ease of connectorization, optical fibers 18 are usually terminated in connectors or sockets 50. After preparing fiber ends, socket 50 is inserted through the hole formed in backing film 14 (FIG. 7*c*). Finally, as shown in FIG. 7*d*, a circuit board or other substrate 12 is bonded to backing film 14 and the backing film is cut to fit in the circuit board.

The appliques of the present invention allow the optical paths formed by fibers 18 to be pretested before applying to circuit board 12 or any other substrate. Another benefit of the present invention is that fibers 18 are protected by film 14 when applied to circuit board 12. As previously stated, the backing film may vary depending upon the application. If greater protection for fibers 18 is needed, a stronger or thicker backing may be chosen. A further benefit of the appliques of the present invention is that the risk of damaging a valuable circuit board is greatly reduced. Typically, there is already substantial value invested in a circuit board at the time of providing electrical or optical connections. Using the present invention, the circuit boards do not need to be destroyed if proper alignment is not achieved or if the applique is not working. If waveguides are used and a mistake is made, the circuit board is usually ruined.

Figure 8:
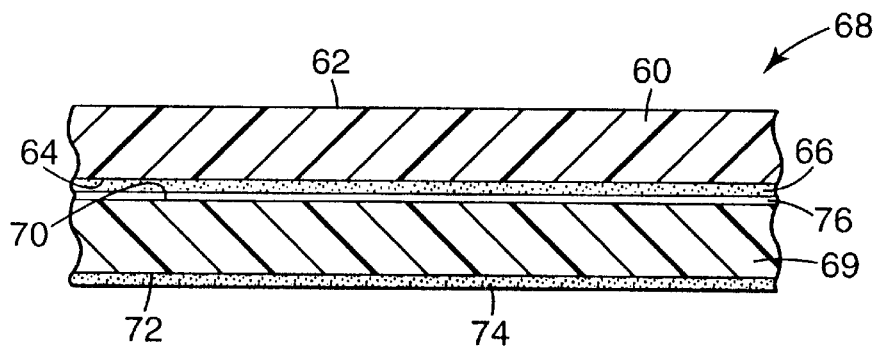
FIG. 8 is a side perspective view of a first alternative embodiment of the present invention.

FIG. 8 illustrates an alternative embodiment of an applique 68 according to the present invention. As stated above, backing film 14 protects fibers 18 when applied to circuit board 12. However, it may be desirable to have a protecting film between fibers 18 and board 12. Thus, as illustrated in FIG. 8, a first backing film 60 is provided having a top surface 62 and a bottom surface 64. A first adhesive layer 66 is provided on bottom surface 64. A second backing film 68 is provided having a top surface 70 and a bottom surface 72. A second adhesive layer 74 is provided on bottom surface 74. At least one optical fiber 76 is sandwiched between backing films 60 and 68. Applique 68 is then mounted to a substrate such as a circuit board and bonded in place with adhesive 74. As with the embodiment described above, microstructures (not shown in FIG. 8) could also be included to allow for repositionability or fiber alignment.

Figure 9:
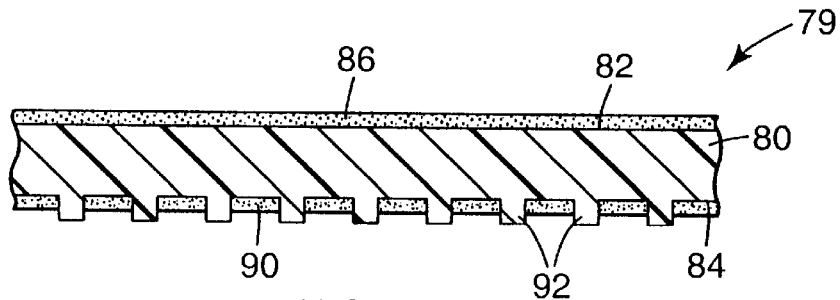
FIG. 9 is a side perspective view of a second alternative embodiment of the present invention.

FIG. 9 illustrates a further alternative embodiment of an applique 79 according to the present invention. A backing layer or film 80 is provided having a top surface 82 and a bottom surface 84. An adhesive 86, such as a hot melt adhesive, is provided on top surface 82. At least one optical fiber (not shown) may be bonded to top surface 82 via adhesive 86. A second adhesive layer 90 is provided on bottom surface 84. Preferably adhesive layer 90 is a pressure sensitive adhesive that allows repositionability. Microstructure 92, similar to those described above, may also be provided on bottom surface 84. Applique 79 is designed to mount on a substrate, such as a circuit board, with bottom surface 84 being adhered to the substrate with adhesive layer 90.

Figure 10:
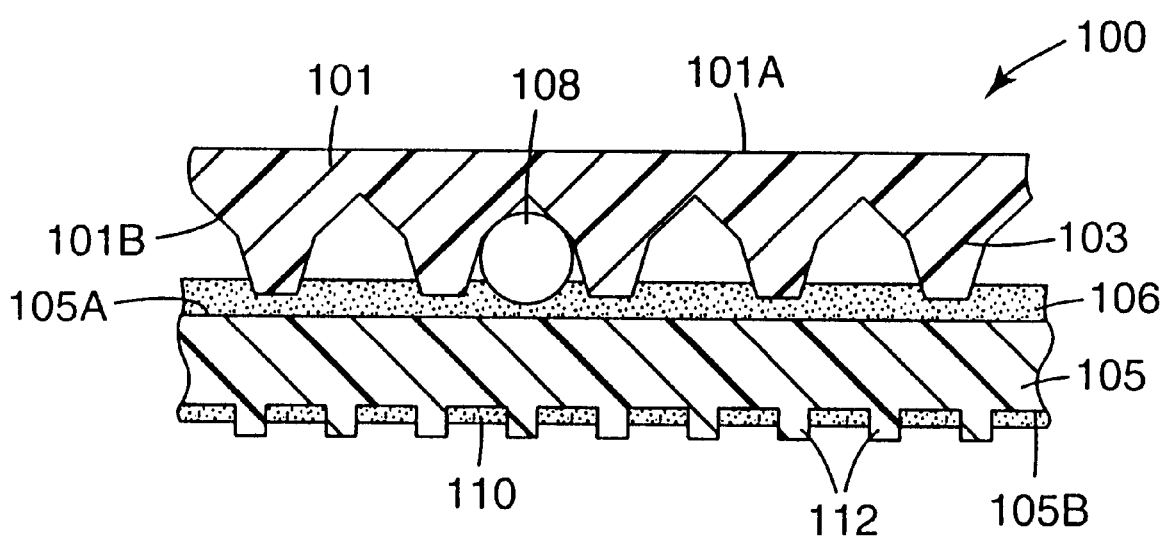
FIG. 10 is a side perspective view of a third alternative embodiment of the present invention.

FIG. 10 illustrates a further alternative embodiment of an applique 100 according to the present invention. A cover layer or film 101 is provided having a top surface 101A and a bottom surface 101B. A backing layer or film 105 is provided having a top surface 105A and a bottom surface 105B. An adhesive 106 such as a hot melt adhesive or a pressure sensitive adhesive, is provided on top surface 105A of the backing layer 105. At least one optical fiber 108 is bonded between bottom surface 101B of the cover layer 101 and top surface 105A of backing layer 105 via adhesive 106. The bottom surface 101B of the cover layer 101 is provided with fiber alignment microstructure 103 which ensures proper positioning of the at least one optical fiber 108. Alternatively, such fiber alignment microstructure could be provided on top surface 105A of the backing layer. A second adhesive layer 110 is provided on bottom surface 105B of the backing layer. Preferably, adhesive layer 110 is a pressure sensitive adhesive that allows repositionability. Crushable microstructure 112, similar to those described above, may also be provided on bottom surface 105B to enhance repositionability. Applique 100 is designed to mount on a substrate, such as a circuit board, with bottom surface 105B being adhered to the substrate with adhesive layer 110.

Although a certain preferred embodiment has been shown and described, it should be understood that many changes and modifications could be made therein without departing from the spirit or scope of the appending claims.

What is claimed is:

1. A method of optically connecting a plurality of optical components on a substrate, the method comprising the steps of:

providing a backing layer;

providing at least one optical fiber coated with an adhesive;

placing the at least one optical fiber on the backing layer in a desired pattern releasably securing the at least one fiber to the backing layer;

placing the at least one fiber and the backing layer on a substrate in a desired position; and fixedly adhering the at least one fiber to the substrate.

2. The method as in claim 1 further including the step of removing the backing layer while leaving the at least one fiber adhered to the substrate.

3. A method of fabricating an optical circuit applique having a backing layer, an adhesive coating and at least one optical fiber, the method including the steps of:

providing a supply of backing layer;

applying an adhesive coating to the backing layer;

forming a plurality of microstructures in the adhesive coating in a desired pattern to form a plurality of channels;

providing at least one optical fiber;

securing the at least one optical fiber in at least one of the plurality of channels;

forming a receiving cavity in the backing layer; and placing a socket in the receiving cavity.

4. The method as in claim 3 further including the step of preparing the at least one fiber for termination in the sockets.

5. A preformed fiber optic applique for mounting to a substrate comprising:

a backing layer;

a temporarily repositionable adhesive layer applied to the backing layer; and at least one fiber bonded to the temporarily repositionable adhesive layer, further comprising microstructures formed on the backing layer.

6. The applique as in claim 5 wherein the microstructures are positioned to form channels and wherein the at least one fiber is positioned in the channels.

7. A preformed fiber optic applique for mounting to a substrate comprising:

a backing layer;

a temporarily repositionable adhesive layer applied to the backing layer; and at least one optical fiber bonded to the temporarily repositionable adhesive layer, further comprising microstructures formed on the backing layer.

8. The applique of claim 7 wherein the microstructures are crushable.

9. The applique as in claim 7, further comprising microstructures formed in the temporary repositionable adhesive layer.

10. The applique as in claim 9 wherein the microstructures are crushable.

11. The applique as in claim 9 wherein the microstructures are positioned to form channels and wherein the at least one fiber is positioned in the channel.

12. The applique as in claim 7 wherein the microstructures are positioned to form channels and wherein the at least one fiber is positioned in the channels.

13. A preformed fiber optic circuit for bonding to a substrate comprising:

a backing layer;

a plurality of microstructures formed on the backing layer in a desired pattern to form a plurality of channels;

an adhesive layer applied to the backing layer wherein the adhesive layer has a desired depth and wherein the plurality of microstructures protrude from the backing layer above the desired depth of the adhesive layer; and at least one optical fiber bonded to the backing layer in at least one of the plurality of channels.

14. The applique as in claim 13 wherein the adhesive layer is a temporarily repositionable adhesive.

15. The applique as in claim 14 wherein the temporarily repositionable adhesive is selected from the group consisting of: pressure sensitive adhesives, pressure sensitive adhesives having crushable microstructures, partially cured adhesives containing crushable microspheres with curing catalyst inside, light-curable adhesives, heat-curable adhesives, and hot melt adhesives.

16. The applique as in claim 13 where the at least one optical fiber is a silica fiber.

17. The applique as in claim 16 wherein the at least one optical fiber is routed to form a bend.

18. The applique as in claim 17 wherein the bend radius of the plurality of optical fibers is less than 3 inches.

19. The applique as in claim 18 wherein the bending stress of the plurality of optical fibers is less than 100K psi.

20. The applique as in claim 13 wherein the microstructures are crushable.

21. A preformed fiber optic applique comprising:

a cover with a top surface and a bottom surface;

a backing with a top surface and a bottom surface;

a first adhesive layer between the top surface of the backing and the bottom surface of the cover;

at least one optical fiber bonded to the first adhesive layer and between the cover and the backing; and a second adhesive layer on the bottom surface of the backing; and alignment microstructures on the bottom surface of the cover.

22. The applique as claimed in claim 21, further comprising crushable microstructures on the bottom surface of the backing.

23. A preformed fiber optic applique comprising:

a cover with a top surface and a bottom surface;

a backing with a top surface and a bottom surface;

a first adhesive layer between the top surface of the backing and the bottom surface of the cover;

at least one optical fiber bonded to the first adhesive layer and between the cover and the backing; and a second adhesive layer on the bottom surface of the backing; and further comprising alignment microstructures on the top surface of the backing.

* * * * *

UNITED STATES PATENT AND TRADEMARK OFFICE
CERTIFICATE OF CORRECTION

PATENT NO.: 5,902,435
DATED: May 11, 1999
INVENTOR(S): Michael Alan Meis, Gordon Dwight Henson, Terry Lee Smith, Robert Travis Smith, and Dewain Robert Goff It is certified that error appears in the above-identified patent and that said Letters Patent is hereby corrected as shown below:

In the Claims:

Col. 10, Line Line 15: "less than 3 inches" should read -- less than 0.3 inches -- .

Signed and Sealed this

Twelfth Day of October, 1999

Attest:

Q. TODD DICKINSON

*Attesting Officer*   Acting Commissioner of Patents and Trademarks

UNITED STATES PATENT AND TRADEMARK OFFICE
Certificate

Patent No. 5,902,435                                                       Patented: May 11, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael Alan Meis, Stillwater, MN; Gordon Dwight Henson, Lake Elmo, MN; Terry Lee Smith, Roseville, MN; Robert Travis Smith, Round Rock, TX; Dewain Robert Goff, Newport, MN; and Nicholas A. Lee, Woodbury, MN.

Signed and Sealed this Tenth Day of June 2003.

*RICHARD CRISPINO*
*Supervisory Patent Examiner*
Art Unit 1734